United States Patent
Thiel et al.

(10) Patent No.: US 12,253,350 B2
(45) Date of Patent: Mar. 18, 2025

(54) THz MEASUREMENT METHOD AND THz MEASUREMENT DEVICE FOR MEASURING A MEASUREMENT OBJECT

(71) Applicant: CITEX HOLDING GMBH, Melle (DE)

(72) Inventors: Marius Thiel, Osnabrück (DE); Ralph Klose, Melle (DE)

(73) Assignee: CITEX HOLDING GMBH, Melle (DE)

( * ) Notice: Subject to any disclaimer, the term of this patent is extended or adjusted under 35 U.S.C. 154(b) by 234 days.

(21) Appl. No.: 18/018,988

(22) PCT Filed: Aug. 4, 2021

(86) PCT No.: PCT/DE2021/100669
§ 371 (c)(1),
(2) Date: Jan. 31, 2023

(87) PCT Pub. No.: WO2022/028655
PCT Pub. Date: Feb. 10, 2022

(65) Prior Publication Data
US 2023/0288189 A1 Sep. 14, 2023

(30) Foreign Application Priority Data
Aug. 4, 2020 (DE) .......................... 102020120547.3

(51) Int. Cl.
*G01B 11/06* (2006.01)
(52) U.S. Cl.
CPC .................................. *G01B 11/06* (2013.01)
(58) Field of Classification Search
None
See application file for complete search history.

(56) References Cited

U.S. PATENT DOCUMENTS

2010/0280779 A1  11/2010  White et al.
2013/0204577 A1*  8/2013  Savard ............... G01B 11/0691
                                                            702/172
(Continued)

FOREIGN PATENT DOCUMENTS

DE  202016008526  5/2018
DE  102017125753  5/2019
(Continued)

OTHER PUBLICATIONS

International Search Report and Written Opinion for PCT/DE2021/100669 dated Oct. 28, 2021.
German Office Action for DE 10 2020 120 547.3.

*Primary Examiner* — Hoon K Song
(74) *Attorney, Agent, or Firm* — Barnes & Thornburg LLP

(57) ABSTRACT

The invention relates to a THz measuring method for measuring a measured object (18), including the steps:
calibration measurement with emitting a THz transmission beam (5) through an empty measuring space (6) towards a main reflector (3) along an optical axis (A) and reflection of the THz transmission beams (5) at the main reflector back to the THz-Transceiver (5), which receives a signal amplitude, where a main reflection peak (P0) at a calibration time (tP0) is determined,
introducing a measured object (18) into the measuring space (6),
object measurement with emitting the THz transmission beams (5) from the THz transceiver along the optical axis (A) through the measuring space and the measured object,
where partial reflected beams reflected back from the boundary surfaces along the optical axis are detected at partial reflection times (t1, t2, t3, t4), and a main
(Continued)

Figure 1:
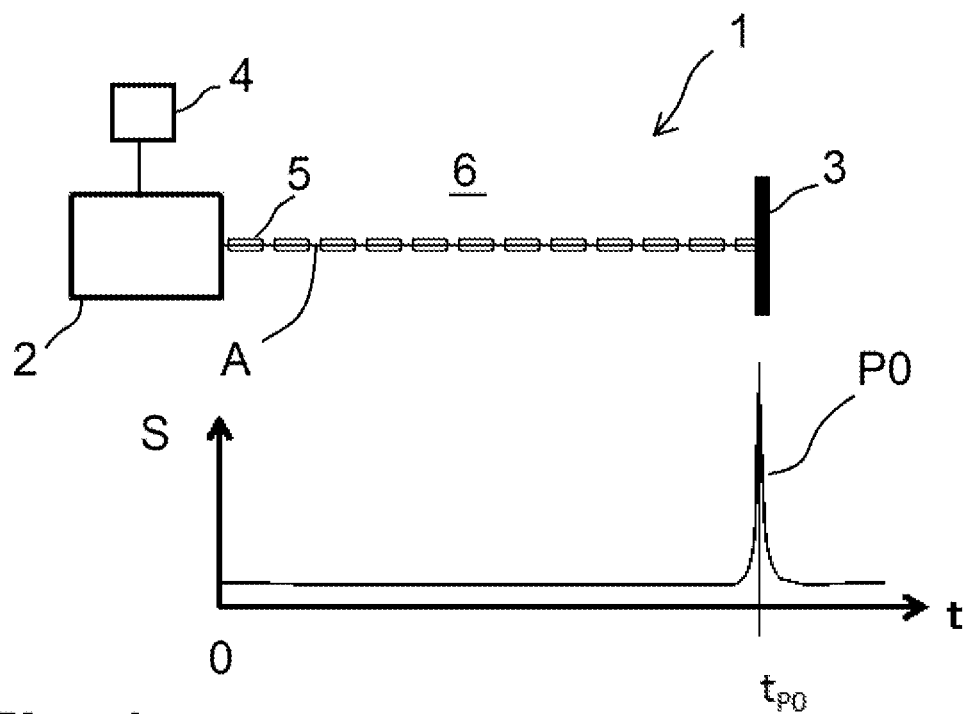

reflection peak (P1) generated at a main reflection time (tP1) at the main reflector (3) is detected, where, in the case that for at least one boundary surface no partial reflection peak in the signal amplitude is determined, a geometric layer thickness (WT34) of a wall region is determined by means of determining a total time delay of the main reflection time of the object measurement in relation to the calibration time of the calibration measurement and allocating the total time delay to a sum of the temporal delays of the THz transmission beam (5) in the wall regions.

14 Claims, 3 Drawing Sheets

(56) References Cited

U.S. PATENT DOCUMENTS

| | | | |
|---|---|---|---|
| 2014/0264032 A1* | 9/2014 | Neshat | G01J 3/42 |
| | | | 250/339.08 |
| 2021/0025816 A1* | 1/2021 | Breitenborn | G01N 21/3581 |
| 2022/0057333 A1* | 2/2022 | Klose | G01N 21/8806 |

FOREIGN PATENT DOCUMENTS

| | | |
|---|---|---|
| DE | 102018124175 | 4/2020 |
| EP | 3524930 | 8/2019 |

\* cited by examiner

THz MEASUREMENT METHOD AND THz MEASUREMENT DEVICE FOR MEASURING A MEASUREMENT OBJECT

CROSS REFERENCE TO RELATED APPLICATIONS

This application is a U.S. national stage application under 35 U.S.C. § 371(b) of International Application No. PCT/DE2021/100669 filed Aug. 4, 2021, which claims priority to the German Patent Application No. 102020120547.3 filed on Aug. 4, 2020, the disclosures of both of which are hereby expressly incorporated by reference in their entirety.

The invention relates to a THz measuring method as well as a THz measuring for measuring of a measured object, in particular for determining von layer thicknesses of the measured object.

When THz measuring layer thicknesses of measured objects a THz transmission beam is emitted along an optical axis from a THz transceiver through a measured object. In particular, measured objects made of plastics and Gummi, but also, e.g., paper or ceramic materials are in principle permeable to THz radiation and have a refraction index n distinctly differing from the refraction index n0=1 in a vacuum or air respectively. Thus, when the THz transmission beam passes through the boundary surfaces of the measured objects always a partial reflected beam is reflected which, generally, does not significantly attenuate the intensity or radiated power respectively of the THz transmission beams so that the THz transmission beam is able to pass through a plurality of such boundary surfaces one after another. The reflected partial reflected beams can be detected again by the THz transceiver so that a signal amplitude is formed in which measuring peaks are received at certain times. Such a measurement can be carried out as a direct time-of-flight measurement, as a frequency modulation or using pulsed THz radiation.

The measurements may be carried out, in particular, in an endless process wherein a measured object is continuously guided through the measuring space and its boundary surfaces to be measured are primarily oriented perpendicular to the optical axis. Thus, it is possible, in particular, to measure hoses and profiles directly upon being manufactured.

The determined signal amplitude can be used to carry out measurements of the wall thicknesses and internal volumes, e.g., the internal diameter of a hose or profile.

It is apparent, however, that in the case of some measurements it is not possible to directly determine the reflection peak upon passing through the respective boundary surface because the boundary surface is not oriented perpendicular to the optical axis of the THz transmission beam. This may occur, in particular, with sagging effects at extruded measured objects, in particular, pipes. Here, the previously extruded, still warm material, in particular plastics or rubber, may run down at the wall regions thereby creating, in particular, an interior surface which is not perpendicular to the optical axis. Such sagging is permitted in principle unless it causes the internal diameter to be reduced too much or the wall regions are thinned out too much.

Moreover, it is possible to measure e.g. profiles having different boundary surfaces not all of which can be aligned perpendicular to the optical axis.

Thus, often THz measuring devices are utilized that comprise a plurality of THz measuring devices positioned around the measuring space so as to be able to potentially cover inclined boundary surfaces. However, even that is not possible in all cases, and it is also expensive.

The document DE 20 2016 008 526 U1 describes a device for measuring a diameter and/or a wall thickness of a strand, including a THz transmitter and THz receiver, as well as a reflector arranged behind the strand. An evaluation means determines the diameter and/or the wall thickness based on the measuring signals received.

The citation DE 10 2018 124 175 A1 describes a method for controlling a production system for planar or strand-shaped bodies using measuring radiation in the Gigahertz or Terahertz frequency range, where a refraction index of the body and/or an absorption of the measuring radiation in the body is determined in order to control the production system.

US 2013/204577 A1 describes an analytical model describing the path of radiation through a coated continuous web, where a layer thickness and a refraction index as variables determine the velocity and direction of the radiation. Hereby, the Das model determines properties of the emitted radiation on the basis of properties of the incident radiation and initially pre-determined vales of the layer thickness.

EP 3 524 930 A1 describes an examination means, an examination method, a computer program and a recording medium, where a radiation transmitter radiates THz waves onto a sample having a plurality of successive layers, and THz radiation emitted by the sample is detected so as to generate a detected waveform, where in an assessment means a position of the first boundary surface is determined on the basis of a pulse wave of a second boundary surface and stored values.

US 2010/280779 A1 describes a system and a method for high precision measuring time-of-flight positions of pulses in time domain data. example data are the passage time of pulses in time domain THz (TD-THz)-data. The precision of the pulse timing directly influences the precision of the measurement of sample characteristics.

The document DE 10 2017 125753 A1 describes a THz measuring method and a THz measuring apparatus for measuring at least one wall thickness of a tubular object to be measured, where a main THz sensor emits a main THz beam along a first optical axis through an axis of symmetry of the measured object and receives THz radiation reflected from the exterior surface and interior surface, whereby an additional THz sensor is provided for emitting an additional THz beam along a second optical axis adjusted in relation to the first axis of the main sensor and detects the reflected additional THz beam. Hereby, an internal wall thicknesses deformation is determined from the signal amplitudes of the main THz beam and the additional THz beam.

It is the object of the invention to create a THz measuring method and a THz measuring device allowing for a secure determination even in the case of non-detectable or possibly inclined boundary surfaces.

This task is solved by a THz measuring method and a THz measuring device according to the independent claims. Preferred further developments are described in the sub-claims.

The THz measuring device according to the invention may, in particular, be utilized using the THz measuring method according to the invention, i.e., in particular, to carry out the same. The THz measuring method according to the invention may, in particular, be carried out using the THz measuring device according to the invention.

The THz transmission beam may be emitted and correspondingly detected, in particular, in the frequency range of 10 GHz to 10 THz, in particular 50 GHz to 8 THz, e.g. 50 or 80 GHz to 3 or 5 THz. Thus, it may also lie in the band of radar radiation or microwave radiation.

The THz transceiver may emit and detect the THz transmission beam by direct time-of-flight measurement, frequency modulated and/or as pulsed radiation, where der THz transceiver may be designed, in particular, fully electronically.

The measured objects may, in particular, be made from a plastic material or rubber, but also from paper, glass or ceramics.

The invention is footed on the idea of carrying out in advance a calibration or empty measurement at a main reflector (also partial reflector), in particular, total reflector or mirror, provided behind the measuring space, so as to determine the time of flight of the empty measuring space and compare to this any subsequent measurements, i.e., object measurements. Thus, initially, a calibration measurement is carried out through the empty, i.e., in particular, air-filled, measuring space, and a calibration time of the main reflection peak is determined.

In a subsequent object measurement, partial reflection peaks of the boundary surfaces are determined, and layer thicknesses along the optical axis, i.e. wall regions or air gaps are detected as time differences between the partial reflection peaks. If the partial reflection peaks or one or two boundary surfaces are absent there may be, in principle, an inclination or also a corresponding roughness of the surface. Thus, the layer thickness of a material layer or, respectively, a wall thickness cannot be determined directly, however, it is possible to determine the time of flight up to the main reflection peak and compared to the calibration measurement so as to determine the total time delay of the THz transmission beam up to the main reflector.

This total delay of the total reflection peak in the signal amplitude in relation to the calibration measurement corresponds to the total delay of the THz transmission beam through the material of the measured object, i.e. the sum of the wall thicknesses (or, respectively, the layer thicknesses filled with the material). Thus, it is possible to set up a system of equations via which a layer thickness can be determined which cannot be determined directly, because in the system of equations the additional information of the total delay through the material is available so that merely one parameter is missing and, thus, a missing layer thickness can be determined.

Thus, it is possible, in particular, to measure e.g. a pipe or a corresponding measured object in which effects like sagging appear at the interior surface of a wall. Thus, it is possible, in particular, to assess the sagging, and it is possible to determine whether the sagging lies within a permitted range so that the measured object is acceptable despite a missing internal boundary surface of one of the wall regions.

Furthermore, it is even possible to measure measured objects which have bars or regions including two non-detectable boundary surfaces, i.e., boundary surfaces that are not perpendicular to the optical axis. This may be, e.g., a multi-chamber profile with an inclined inner slat or an inner bar subdividing the interior space. Moreover, it is also possible to correspondingly measure a stand-alone, inclined profile or, respectively, a diagonal plate. Thus, in such cases the total delay of the main reflection peak is directly associated with the geometric layer thickness of the material.

After having determined a layer thickness of an inclined wall a further evaluation can be carried out in which the angle of the boundary surface in relation to the optical axis is used and, thus, e.g., with internal slats or bars, under consideration of the projection (sine or cosine) the geometric layer thickness of the bar or the slat is determined.

Moreover, e.g., in direct time-of-flight measurements, there are differences in the measuring peaks of a beam entering the material and the measuring peaks of a beam exiting the material, in particular, involving opposing amplitude sweeps. Thus, such further information of an entry peak or exit peak can be used to verify which boundary surface is missing in the signal amplitude.

Further, according to a preferred embodiment, the measured object can be measured in an endless process, i.e., continuously guided through the measuring space, in particular along a transport direction perpendicular to the optical axis so that object measurements are carried out continuously and compared to one another so that in case a measuring peak is lost, e.g., of an interior surface, a corresponding change of this boundary surface can be inferred. Thus, it is possible, e.g., to detect the appearance of sagging. Thus, it is possible, in particular, initially, in regular measurements, to unambiguously match the boundary surfaces from the measuring signal, and, thereafter, when the loss of a measuring peaks is detected from the comparison to the previous measurements, to detect which measuring peak is lost and, thus, which boundary surface is affected so that, here, the relevant layer thickness can subsequently be directly determined in the measuring method according to the invention.

According to a preferred embodiment, the measured object comprises a uniform material or, respectively, a material with a consistent refraction index auf. Thus, it is possible, to use a uniform refraction index of the material for the determination, which may, e.g., even be individually known.

Hereby, the refraction index may, for one thing, be known and e.g., for another, be input manually by the user.

However, when measuring certain measured objects, the refraction index of the material will initially be unknown or not precisely known. Thus, the refraction index of the material may be unknown or may change, if e.g. different source materials are used and mixed, e.g. when extruding plastics objects or rubber objects. Depending on the mixing ratio the refraction index of the measured object may subsequently vary so that the mixing ratio may be unknown, and it will not be possible to directly determine material thicknesses because of the unknown refraction index.

Thus, according to a particularly preferred embodiment, the refraction index may also be determined in advance.

To that end, it is provided that initially an empty measurement or calibration measurement is carried out, in which the THz transceiver measures the empty measuring space at the end of which the main reflector, i.e., in particular, a mirror, is arranged for reflecting the THz transmission beam. Thus, the THz transceiver emits the THz transmission beam through the measuring space and detects a calibration main reflection peak of the main reflector at a calibration time.

The calibration measurement is followed, without changing the measuring device, i.e. also without adjusting the main reflector, by the object measurement in which the measured object is introduced into the measuring space, whereby it may, e.g., be guided continuously through the measuring space.

When measuring the object, a measuring main reflection peak of the main reflector and measuring peaks (partial reflection peaks) of the boundary surfaces are determined.

The invention recognizes that a time difference between the main reflections of the calibration measurement and the object measurement can be compared to the total time delay resulting from the sum of the wall times of flight, i.e. the times of flight or times of flight delays respectively in the material regions, whereby the times of flight in the material regions are determined by the measuring peaks (partial reflection peaks).

Thus, the difference of the der reflection times of the main reflector in the calibration measurement and the object measurement can be used to determine a delay of the main reflection peak, corresponding to the sum of the temporal delays of the wall times of flight compared to the corresponding times of flight in air or vacuum.

Both the delay of the main reflection peak and the temporal delay of the sum of the wall times of flight in turn depend on the refraction index and the sum of the geometric wall thicknesses.

Thus, it is possible to construct an equation in which the refraction index and the determined times of the measuring peaks of the two measurements occur so that the refraction index can be determined from this.

The measured object can be guided continuously through the measuring space, e.g., a pipe with a front and rear wall region, in particular, with its axis of symmetry perpendicular to the optical axis, and the refraction index of the material of the measured object can be continuously determined, when or, respectively as long as the measuring peaks of the boundary surfaces can be detected.

In the case that temporal changes are determined upon determining the refraction index, it is possible to put out error signals and/or correction signals, and/or a regulation of a feed-in of e.g., two different source materials with different refraction indexes, known as such, can be carried out.

Thus, the invention allows for a complex and flexible determination in the occurrence of different states, in particular, even flexible depending on the measurements. Thus, the following steps may be carried out:

first, the calibration measurement,
in the case that all measuring peaks are present, the optional step of determining the refraction index of the material of the measured object,
in the case that all measuring peaks are present, a determination of the geometric layer thicknesses,
in the case that one or more measuring peaks is/are missing, a step of determining the layer thicknesses from a comparison of the differences of the points in time of the measuring peaks to the total time delay.

According to the invention, these steps may also be carried out continuously or, respectively, repeatedly. Thus, it is possible, e.g., when all measuring peaks are present, to continuously carry out the determination of the refraction index and/or a determination of the layer thicknesses; then, if, e.g., a measuring peak is lost, e.g., in the case of sagging, the step of determining the layer thicknesses, according to the invention, can be carried out with a missing measuring peak.

In principle, the refraction index may also be input by the user; this is advantageous, in particular, when there is the case of one or more measuring peaks missing, while it had not been possible to determine the refraction index beforehand.

The THz measuring device according to the invention, in particular, comprises the THz transceiver, the measuring space and the main reflector provided behind the measuring space, as well as a controller and evaluation means for evaluating the signal amplitude, where the THz transceiver may be integrated with the controller and evaluation means in a single unit. The main reflector may be, in particular, a mirror, i.e., total reflector, but other embodiments involving e.g., semi-transparent mirrors as main reflector are also possible, in which, thereby, a partial beam is passed through and, thus, further measurements are to follow in the signal amplitude which can be evaluated.

Figure 2:
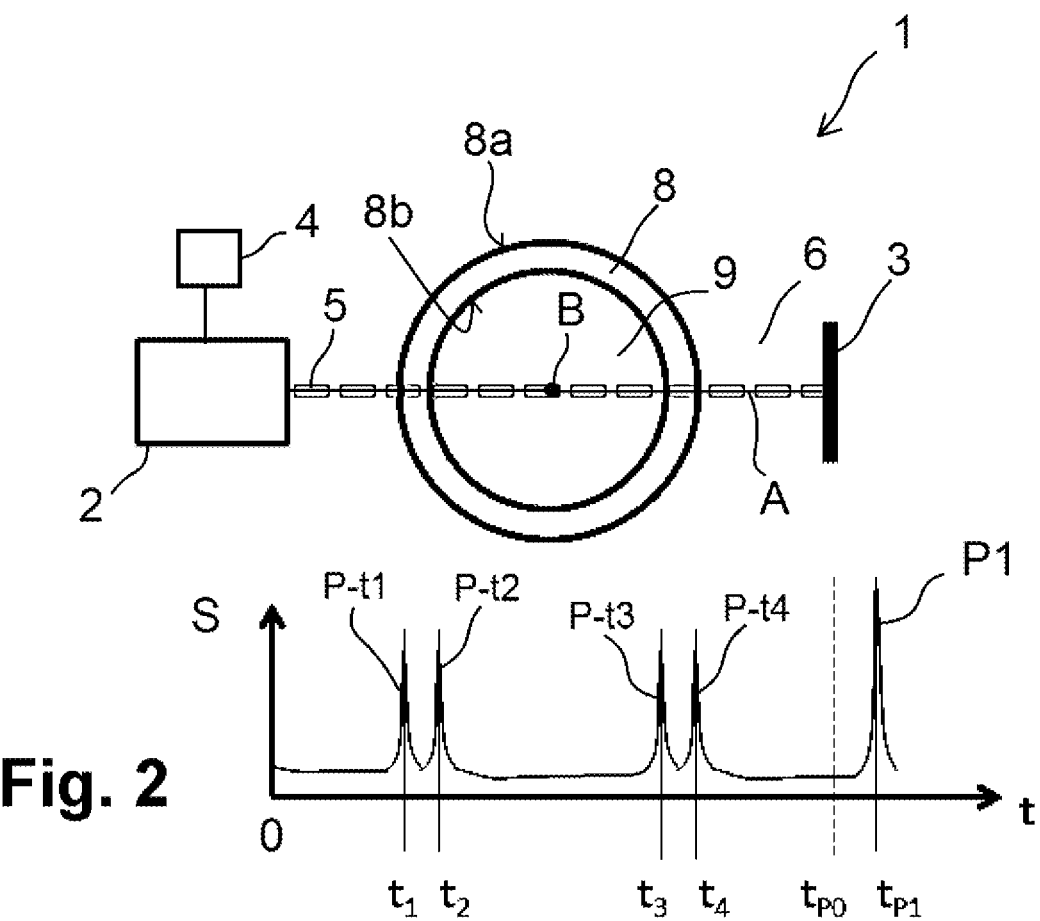
Figure 3:
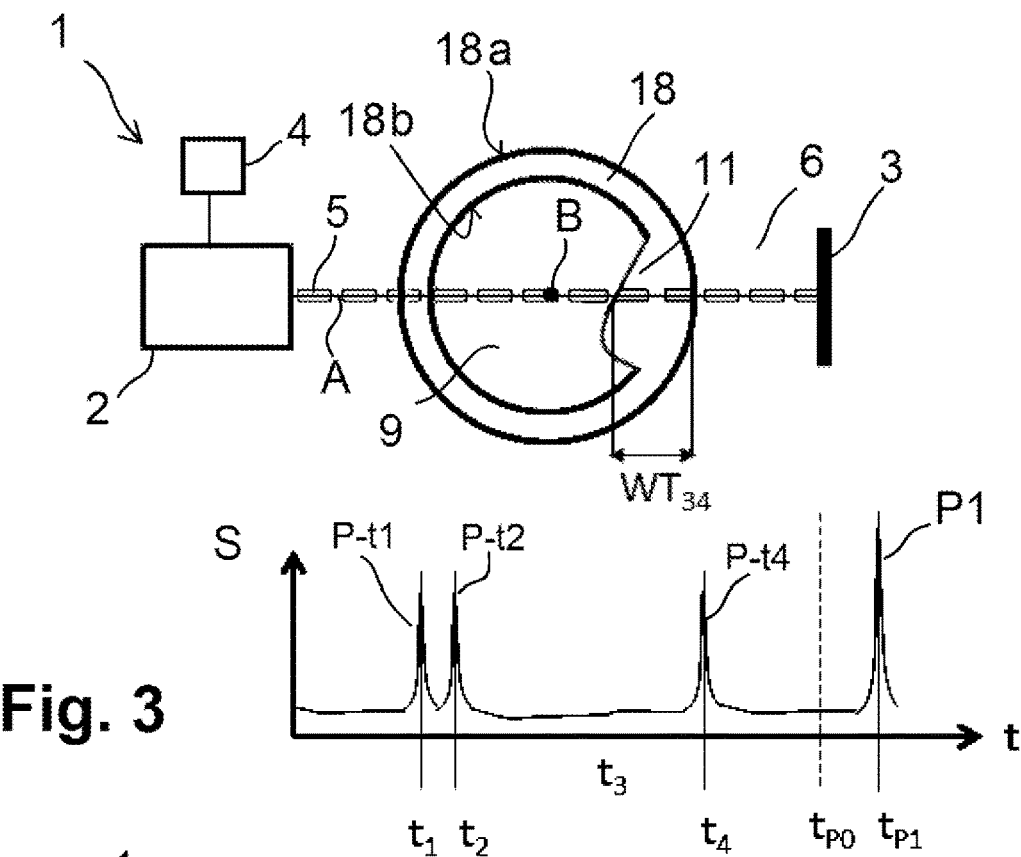
Figure 4:
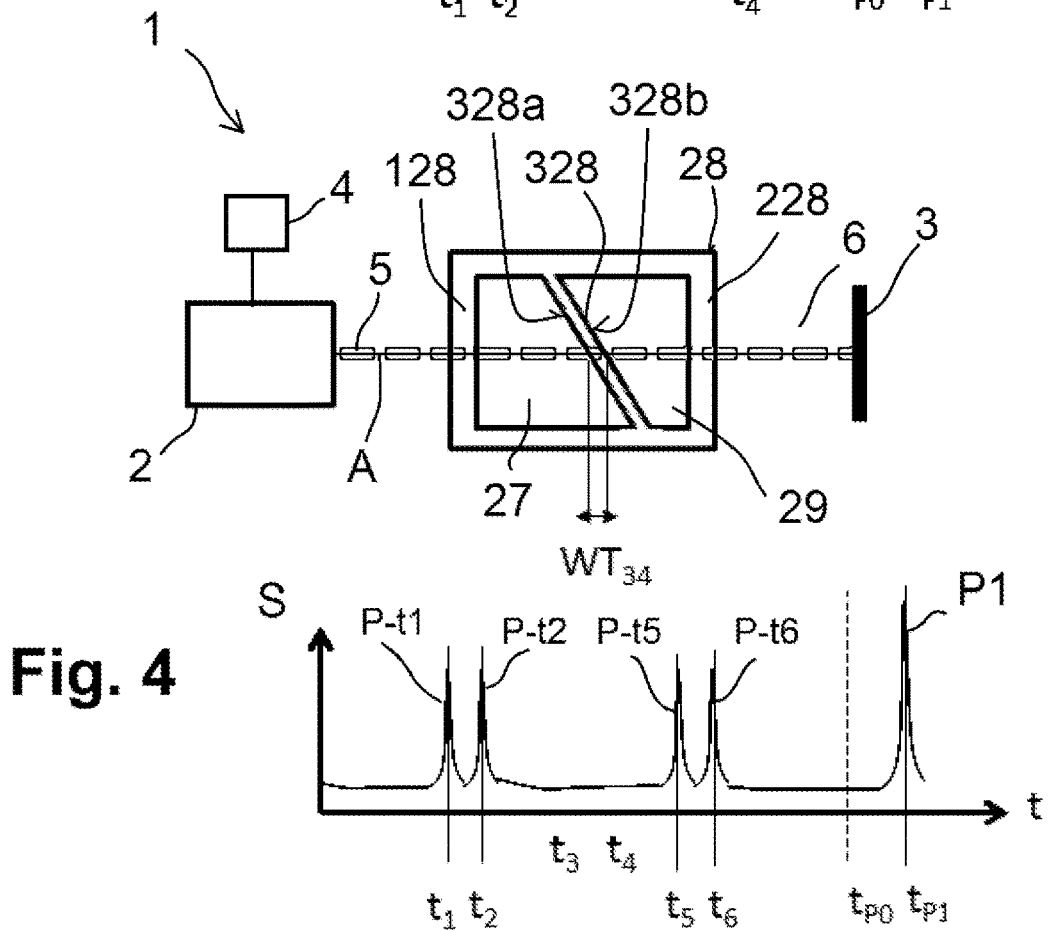
Figure 5:
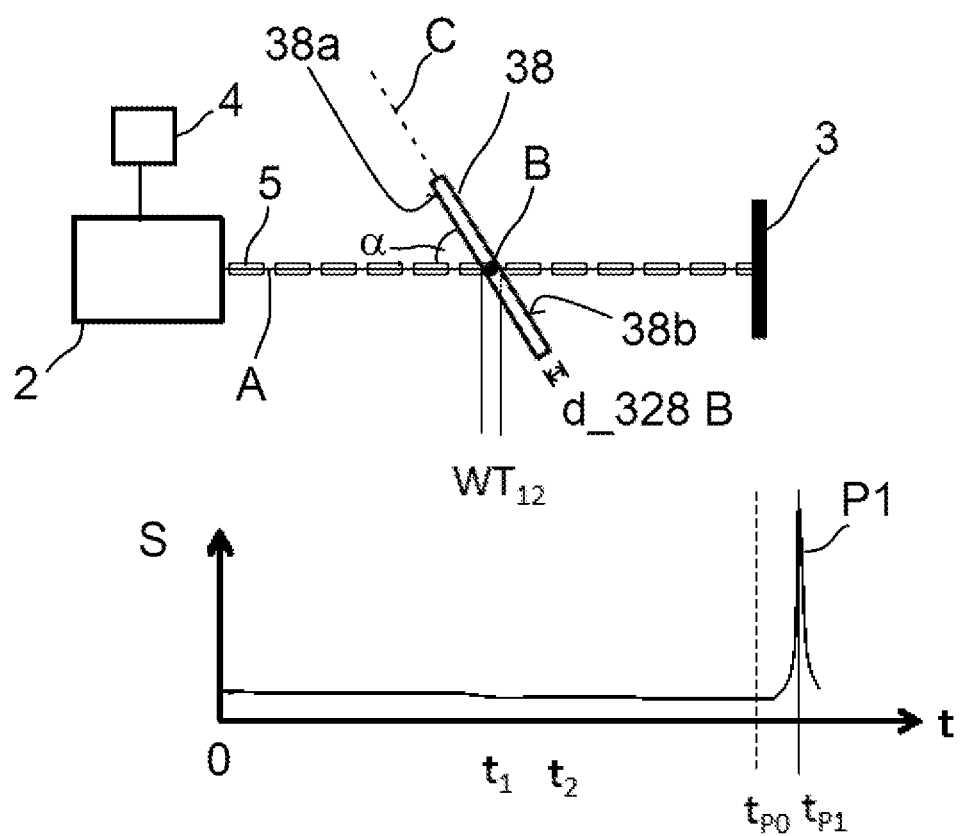

The invention will be further illustrated by means of the attached drawings by means of a few embodiments. It is shown in:

FIG. 1 a measuring device in a calibration measurement or empty measurement with the signal amplitude, for calibrating the subsequent object measurements;

FIG. 2 a measurement of the cylindrical pipe as measured object, with the signal amplitude;

FIG. 3 a measurement of a cylindrical pipe with sagging, with the signal amplitude;

FIG. 4 a measurement of a multi-chamber profile, with the signal amplitude;

FIG. 5 a measurement of an inclined band, with the signal amplitude.

According to FIG. 1, a THz measuring device 1 comprises a THz transceiver 2, a mirror 3 and a controller and evaluation means 4. the THz transceiver 2 emits a THz transmission beam 5 along an optical axis A through a measuring space 6 which is provided to receive different measured objects between the THz transceiver 2 and the mirror 3. The mirror 3 is aligned perpendicular to the optical axis A so that in the empty measurement, shown in FIG. 1, the THz transmission beam 5 is mirrored along the optical axis A back to the THz transceiver 2 and detected there.

The THz transceiver 2 may, in particular, be designed fully electronically thereby having a transmitter and receiver dipole. The THz-measurement may be based on a direct time-of-flight measurement; further, a frequency modulation is also possible, and/or the use of pulsed THz radiation. The THz transmission beam 5 may, in particular, be emitted in a frequency range between 10 GHz and 10 THz, in particular 5 GHz and 8 THz, i.e. er may correspond to Terahertz radiation, microwave radiation and/or radar radiation.

Thus, in step St1 of the empty measurement of FIG. 1, the THz transmission beam 5 passes through the empty measuring space 6, i.e. with merely air as medium, in which the speed of light c0 is essentially equal to the speed in a vacuum. Thus, in the signal amplitude S shown in FIG. 1, which is plotted in its temporal sweep, i.e., in relation to time t, at time tP0 a total reflection peak P0 at the mirror 3 is determined.

Thus, following the first procedure step St1, the calibration measurement, the point in time tP0 of the calibration main reflection peak P0 is fixed or calibrated respectively. This arrangement will not be changed afterwards.

The calibration measurement of FIG. 1 is followed in step St2, without adjusting the elements 2, 3, by an object measurement of a first measured object 8, in this case a single-layer, symmetrical cylindrical pipe 8, which is guided, e.g., along its axis of symmetry B perpendicular to the optical axis A through the measuring space 6 and has an exterior surface 8a as well as an interior surface 8b. The measured object 8 is made from a material transparent to the transmission beam 5 or, respectively, the THz radiation, in particular plastics, rubber, but even, e.g., ceramics or paper, having a refraction index n1≠1 for the THz transmission beam 5. Thus, when passing through the boundary surfaces 8a and 8b there will each occur a partial reflection of the THz transmission beams 5, for which, according to the signal amplitude S of FIG. 2, measuring peaks (partial reflection peaks) P-t1, P-t2, P-t3, P-t4 are determined each at times t1, t2, t3 and t4. Because, here, the cylindrical pipe 8 serving as the measured object is guided symmetrically with its axis of symmetry B through the optical axis A, four measuring peaks can be sensed, i.e., upon entering the exterior surface 8a, exiting the interior surface 8b, thereafter upon passing though the interior diameter D1 of the inner space 9i of the pipe 8, then again upon entering the interior surface 8b and subsequently exiting the exterior surface 8a into the measuring space 6 or exterior space respectively. Subsequently the THz transmission beam 5 will arrive at time tP1 at the mirror 3 and will be reflected there so that the measuring peak P-t1 is detected accordingly. Since the partial reflections each make up only a portion of the intensity of, e.g., 2 to 5% of the incoming or. respectively, exiting beam, multiple reflections at the boundary surfaces 8a, 8b are of no relevance for the measurement.

In FIG. 2, in addition to the time tP1 of the total reflection peak at the mirror 3, the time tP0 form FIG. 1 is drawn in also, which, consequently corresponds to the empty measurement of FIG. 1. As can be seen in FIG. 2, here, the current measuring peak P1 of the total reflection is delayed in time in relation to the time tP0 of the calibration measurement or empty measurement respectively from FIG. 1, because the THz transmission beam 5 has passed through the material of the measured object 8 between the times t1 and t2 as well as between the times t3 and t4, and, due to the lower speed of light C1, at n1=C0/C1, has been slower during these two periods of time. Hereby, e.g., in plastics, the refraction index n1 will be 1.5 so that a significant temporal delay will appear thereby allowing measurement of the temporal delays of the total reflection peaks.

Thus, the temporal delay tP1-tP0 can be attributed to the temporal delay in the regions between the times t1 and t2 as well as the time t3 and t4 caused by the material of the cylindrical pipe 8, where it can be assumed here that the refraction index n1 in these time periods is constant or uniform respectively.

In FIG. 2, the following system of equations GL2 can be used, where WTij indicates the layer thickness or width respectively between the boundary surfaces of the measuring peaks at the times ti and tj, i.e., with the front wall width WT12, rear wall width WT34, the internal diameter ID=WT23 and the external diameter OD as summand of these three layer thicknesses, i.e.

$WT_{12} = (t_2 - t_1) \cdot C_0 / 2n_1$ $ID = WT_{23} = (t_3 - t_2) \cdot C_0 / 2n_0$ $WT_{34} = (t_4 - t_3) \cdot C_0 / 2n_1$ $OD = WT_{12} + WT_{23} + WT_{34}$     GL2:

Thus, this object measurement can be used subsequently in a step St3 of a proper object measurement for determining the layer thicknesses WTij, i.e. $WT_{12}$, $WT_{23}$, $WT_{34}$ and therewith also OD.

FIG. 3 shows an embodiment in which, after the calibration measurement of FIG. 1, a cylindrical pipe 18 as measured object is guided through the measuring space 6. In principle, the cylindrical pipe 18 may correspond to the cylindrical pipe 8 of FIG. 2: however, it exhibits a sagging region 11 at its interior surface 18b. Such sagging may occur, in particular, when extruding pipes made of plastics or rubber when the still warm material will run down under gravity influence at the surfaces, in particular, at the interior surface 8. IN principle, such sagging regions 11 are permitted to a certain extent as long as they are not too strong or, respectively, lead to further adverse effects. Thus, it is possible to use as an assessment criterion, e.g., the thickness of the sagging region 11 or, respectively, the remaining internal diameter Di of the cylindrical pipe 18 in this region and correspondingly a reduction of the wall thickness in other regions.

According to the signal amplitude S of FIG. 3, again, in the object measurement of step St2 in the first half of the cylindrical pipe 18 at the times t1 and t2 the proper measuring peaks according to FIG. 2 are determined; subsequently at a corresponding time t3 no measuring peak (reflection peak) is determined, because, here, the interior surface 11 a of the sagging region 11 is not oriented perpendicular to the optical axis A and therefore the THz transmission beam 5 is reflected out of the optical axis A. Subsequently, at time t4, again the proper measuring peak upon exiting the THz transmission beam 5 from the exterior surface 8a of the cylindrical pipe 18 is determined, and subsequently, at time tp1, the total reflection peak at the mirror 3.

Thus, the width WT34 cannot be directly determined from the signal amplitude S (t), and in a step St4 of determining the layer thickness with a missing measuring peak is determined using the system of equations GL3 with the individual equations GL3a, GL3b, GL3c:

GL3:

$GL3a: \ t_{P1} - t_{P0} = (t_2 - t_1) \cdot (n_1 - n_0) + (t_4 - t_3) \cdot (n_1 - n_0)$ $GL3b: \ (t_4 - t_3) = ((t_{P1} - t_{P0})/(n_1 - n_0)) - (t_2 - t_1)$ $GL3c: \ WT_{34} = (t_4 - t_3) \cdot C_0/2n_1 = (((t_{P1} - t_{P0})/(n_1 - n_0)) - (t_2 - t_1)) \cdot C_0/2n_1$ Hereby, in GL3a, the total temporal delay is determined by a comparison of FIG. 3 and FIG. 1 left side as $t_{P1}-t_{P0}$, and equated with the sum on the right side of the individual wall thicknesses. Hereby, the temporal delay of the first wall region is to be used as $(t_2-t_1) \cdot n_1 - (t_2-t_1) \cdot n_0$, i.e. thus, as $(t_2-t_1) \cdot (n_1-n_0)$, accordingly, the temporal delay of the second wall region as $(t_4-t_3) \cdot (n_1-n_0)$.

This can be transformed to GL3b, from which, then after GL3c, the wall thickness WT34 can be determined, which, therefore, can be calculated from known variables and measured variables, namely $t_2$, $t_1$, $t_{P1}$, $t_{P0}$, $n_1$, $n_0$ and $C_0$.

Because there are proper measuring peaks in the region of the times t1, t2 and t4 it is also possible to deduce which boundary surface is not detected, because in the region around t3 a measuring peak is expected but missing.

The measurement according to FIG. 3 may, in particular, follow the measurements according to FIG. 2, in which the pipe 18 was initially without flaws, so that in the signal amplitude S the peak p-t3 is lost.

FIG. 4 shows a further measurement following a calibration measurement of FIG. 1. Hereby, a multi-chamber profile 28 is measured as the measured object, thus, having in der optical axis A a front wall 128 and a rear wall 228 each with two boundary surfaces 128a and 128b as well as 228a and 228b respectively. Further, the profile 28 has an intermediate bar 328, in this case oriented inclined or, respectively, not perpendicular to the optical axis thereby subdividing the interior space of the profile 28 into unequal chambers 27, 29. Thus, in the signal amplitude of FIG. 4 at the times t1, t2 and t5, t6 respectively the reflections at the boundary surfaces of the front bar 128 and the rear bar 228 can be measured. When passing through the inclined bar 328 at times t3, t4, however, no measuring peaks are measured. The time tp1 of total reflection at the mirror 3 in turn is shifted in relation to the time tp0 of the calibration measurement, corresponding to the entire temporal delay by all bars 128, 228 and 328, namely in accordance with their share or, respectively, their length of the path along the optical axis A.

The following applies:

GL4

GL4a: $t_{P1} - t_{P0} =$ $(t_2 - t_1) \cdot (n_1 - n_0) + (t_4 - t_3) \cdot (n_1 - n_0) + (t_6 - t_5) \cdot (n_1 - n_0)$ GL4b: $(t_4 - t_3) = ((t_{P1} - t_{P0})/(n_1 - n_0)) - (t_2 - t_1) - (t_6 - t_5)$ GL4c: $WT_{34} =$ $(t_4 - t_3) \cdot C_0/2n_1 = (((t_{P1} - t_{P0})/(n_1 - n_0)) - (t_2 - t_1) - (t_6 - t_5)) \cdot C_0/2n_1$ In equation 4, too, it is again possible
in a step St4 of determining the der layer thickness in the case of a missing reflex
to determine the layer thickness WT34 by inserting the term (t4−t3) from equation 4b into the equation 4c. Thus, it is again possible to calculate WT34 from known variables and measured variables.

While, in the embodiment of FIG. 4, position and thickness of the bar or, respectively, rib 328 are unknown, it is nevertheless possible to determine its geometric layer thickness along the optical axis A. The geometric rib thickness d_328 is to be determined accordingly under consideration of the geometric angle α of the rib in relation to the optical axis A, i.e., with the sins or cosine respectively of the angle to the optical axis A.

FIG. 5 shows a further measurement wherein in step St2 of the object measurement a measured object 328 is measured which is formed by a band, plate or rib oriented inclined to the optical axis A and e.g. also manufactured in an endless process. According to the embodiment shown here, it may be, in particular, plane-parallel so that its surfaces 328*a* and 328*b* are arranged in parallel and each at a non-perpendicular angle α to the optical axis A; however, the width can also be determined in the case of non-parallel boundary surfaces. The THz transmission beam 5 passes through the boundary surfaces 328A, 328*b*, in each of which partial reflected beams are reflected away which will not be reflected back to the optical axis A, whereby, here, the measured object 328 has a width WT12 along the optical axis A in which the transmission beam 5 will be temporally delayed accordingly. Thus, in der signal amplitude S according to FIG. 5, at times t1 and t2, in which the transmission beam 5 passes through the measured object 328, no measuring peak or any relevant change in signal amplitude S can be detected. Merely, the time tP1 will be detected, at which the total reflection peak P1 occurs at the mirror 3, and from which the temporal delay tP1-tP0 against the total reflection peak of the empty measurement or calibration measurement respectively of FIG. 1 can be determined.

The following is true:

GL5:

GL5a $t_{P1} - t_{P0} = (t_2 - t_1) \cdot (n_1 - n_0)$

GL5b $(t_2 - t_1) = (t_{P1} - t_{P0})/(n_1 - n_0)$

-continued

GL5c $WT_{12} = (t_2 - t_1) \cdot C_0/2n_1$ $= ((t_{P1} - t_{P0})/(n_1 - n_0)) \cdot C_0/2n_1$ so that, again, WT12 can be calculated.
Thus, again, it is possible
in the step St4 of determining layer thicknesses WTi,j in case a reflex is missing—
to insert the term (t2−t1) directly from the equation 5b into the equation 5c, thereby determining the geometric layer thickness WT12 from the measuring data of the empty measurement according to FIG. 1 and the subsequent measurement of FIG. 5.

Here, too, the wall thickness of the measured object 38 perpendicular to its surfaces can be derived under consideration of the geometric angle α between the optical axis A and its axis of symmetry C, i.e. the geometric layer thickness d_328 for α unequal 0 can be determined as follows:

$d\_328 = WT12 * \sin \alpha$.

According to a further advantageous embodiment, subsequent to the calibration measurement of step St1 and prior to step St3 of the object measurement
an optional step St2 of determining the refraction index n1 will be carried out
i.e., a determination of the layer thicknesses is made, without prior knowledge of the refraction index n1 of the material of the measured object 8 or, respectively, in case the refraction index n1 may possibly have changed.

In case the refraction index n1 is unknown, it is possible, in step St2 "determining refraction index n1", to determine the refraction index n1 from a comparison with the calibration measurement of FIG. 1:

Again, in a system of equations GL6, first, an equation GL6a corresponding to the above equations GL3a, GL5a can be used:

$t_{P1} - t_{P0} = (t_2 - t_1) \cdot (n_1 - n_0) + (t_4 - t_3) \cdot (n_1 - n_0)$     GL6a thus resulting, when resolved to n1, in:

$n_1 = ((t_{P1} - t_{P0})/(t_2 - t_1 + t_4 - t_3)) + n_0$     GL6b tP0 is measured in the calibration measurement.
t1, t2, t3, t4, tP1 are measured in the object measurement.
Thus, n1 can be determined using n0=1.
Hereby. It is merely assumed that the measured object exhibits a refraction index n1 that is uniform or, respectively, constant in the measured sections.

The step St1 of calibrating may be performed once prior to introducing the measured object 8 and used subsequently. Thus, in steps St2 material changes during the process can be determined. Thus, as long as all boundary surfaces can be measured directly,
i.e., there is no case of e.g. FIG. 3, 4 or 5,
the refraction index n1 of the measured object 8 can be continuously determined in one step St2.

Thus, in case two materials are mixed, e.g., with refraction indexes n2 and n3 known as such, where n2 unequal n3, the ratio of the materials can be determined from n1.

Thus, there are the following embodiments:
in step St1 first the calibration measurement,
in case all measuring peaks P-ti are present, an optional step St2 of determining the refraction index n1,
in case all measuring peaks P-ti are present, subsequently continuously step St3 of determining the geometric wall thicknesses WTij, in case or one or more measuring peaks P-ti missing, step St4 of determining the layer thicknesses WTi,j by a comparison with the total temporal delay tP1–tP0.

LIST OF REFERENCE NUMERALS

1 THz measuring device
2 THz transceiver
3 reflector, in particular, mirror or total reflector
4 controller and evaluation means
5 THz transmission beam
6 measuring space
8 first measured object, even cylindrical pipe
8a exterior surface of the cylindrical pipe 8
8b interior surface of the cylindrical pipe 8
9 interior space of the cylindrical pipe 8
11 sagging region in FIG. 3
11 a interior surface of the sagging region 11
18 second measured object, cylindrical pipe with sagging in FIG. 3
18a exterior surface of the second measured object 18
18b interior surface of the second measured object 18
28 third measured object of FIG. 4 as multi-chamber profile with an inner bar
128 front wall of FIG. 4
228 rear wall of FIG. 4
328 inner bar or slat of FIG. 4
328a, 328b boundary surfaces of the inner bar 328 of FIG. 4
38 measured object of FIG. 5, inclined bar or layer
38a, 38b boundary surfaces of the measured object 38
A optical axis
B axis of symmetry of the measured objects 8, 18, 28, 38
C geometric axis of symmetry of the measured object 38
ID internal diameter
n0 refraction index of air n0=1
n1 refraction index of the material of the measured object 8
OD external diameter
P0 calibration main reflection peak (total reflection peak)
P1 measuring main reflection peak (total reflection peak)
P-ti measuring peak at time ti
S signal amplitude
t time
tP0 calibration time of the calibration measurement (empty measurement)
tP1 main reflection time of the Object measurement
ti, t1, t2, t3, t4, t5, t6 partial reflection times
t2–t1 temporal delay between times t1 and t2
t4–t3 temporal delay between the times t3 and t4
tP1–tP0 total time delay
WTij geometric layer thickness along the optical axis between the boundary surfaces at passage of the transmission beam 5 at the times ti, tj, geometric layer thicknesses of wall regions or air gaps are determined along the optical axis A
St1 calibration measurement, empty measurement
St2 optional determination of refraction index n1
St3 determining layer thicknesses WTi,j in case of proper measurement of FIG. 2, i.e., in case all measuring peaks are determined
St4 determining layer thicknesses WTi,j in case at least one measuring peak is missing, e.g., FIGS. 3, 4, 5

The invention claimed is:

1. A THz measuring method for measuring a measured object, the THz measuring method comprising the steps of calibration measurement with emitting a THz transmission beam through an empty measuring space towards a main reflector along an optical axis, reflection of the THz transmission beam at the main reflector along the optical axis back to the THz transceiver and detecting a calibration main reflection peak at a calibration point in time, introducing a measured object into the measuring space, object measurement with emitting the THz transmission beam from the THz transceiver along the optical axis through the measuring space and the measured object towards the main reflector, reflection of the THz transmission beam along the optical axis back to the THz transceiver and detecting a measuring main reflection peak of the object measurement at a main reflection point in time, determining a total time delay of the main reflection time in relation to the calibration time, and allocating the total time delay to a sum of the temporal delays of the THz transmission beam in the wall regions and determining geometric layer thicknesses of the measured object.

2. The THz measuring method of claim 1, wherein the THz transmission beam passes through boundary surfaces of the measured object thereby generating partial reflections beams and generating, upon being detected, a signal amplitude with:

the main reflection peak at the main reflection time, and measuring peaks of boundary surfaces oriented perpendicular to the optical axis at partial reflection times, where geometric layer thicknesses of the measured object along the optical axis are determined from temporal differences of the determined partial reflection times of the measuring peaks and its refraction index as air gaps and/or wall regions of the measured object, and where, in the case that in relation to at least boundary surface no measuring peak in the signal amplitude is determined, a geometric layer thickness of a wall region is determined by determining the total time delay and the allocation of the total time delay to the sum of temporal delays in the wall regions.

3. The THz measuring method of claim 1, wherein the THz transmission beam passes through boundary surfaces of the measured object thereby generating partial reflection peaks and generating, upon being detected, a signal amplitude, where the number of boundary surfaces and the sequence of the partial reflection peaks of the boundary surfaces in the signal amplitude is known, and, when a partial reflection peak is missing in the signal amplitude, the non-detected boundary surface is known, e.g. as interior surface of a wall region, in particular, by virtue of a comparison with pre-stored data or model data.

4. The THz measuring method of claim 1, wherein the THz transmission beam is emitted in the band of Terahertz radiation, microwave radiation or radar radiation, in particular, in a frequency range between 10 GHz and 10 THz, preferably 30 GHz and 8 THz, e.g., 50 or 80 GHz to 3 or 5 THz, in particular fully electronically, e.g., with a time-of-flight measurement, frequency modulation and/or pulsed radiation.

5. The THz measuring method of claim 1, wherein, after the calibration measurement, in the measuring step of object measuring, the measured object is continuously transported and measured along a, in particular, symmetry direction of the measured object through the measuring space and through the optical axis.

6. The THz measuring method of claim 5, wherein, in the case where one of the partial reflection peaks is missing or gets lost, the relevant boundary surface is determined from a comparison of several, in particular, successive measurements.

7. The THz measuring method of claim 5, wherein, after being manufactured, e.g., extruded, a measured object is continuously transported through the measuring space and its layer thicknesses, in particular, thicknesses of air gaps and wall regions, are measured, where, in case a missing partial reflection peak of an interior surface of a wall region is detected, a sagging is recognized.

8. The THz measuring method of claim 1, wherein, when determining the layer thickness of a measured object having a front wall region, an air gap, and a rear wall region, in the case where an interior surface of one of the wall regions remain undetected, in particular, in a case of sagging, the following system of equations GL3 is used:

GL3:

$$t_{P1} - t_{P0} = (t_2 - t_1) \cdot (n_1 - n_0) + (t_4 - t_3) \cdot (n_1 - n_0) \quad \text{GL3a:}$$

$$(t_4 - t_3) = ((t_{P1} - t_{P0})/(n_1 - n_0)) - (t_2 - t_1) \quad \text{GL3b:}$$

$$WT_{34} = (t_4 - t_3) \cdot C_0 / 2n_1 \quad \text{GL3c:}$$

where:
$t_{P1} - t_{P0}$=total time delay of the main reflection time (tP1) of the object measurement in relation to the calibration time (tP0) of the calibration measurement
tP1 main reflection time
tP0 calibration time
t2-t1 time difference of the partial reflection times t1 and t2
t4-t3 time difference of the partial reflection times t3 and t4
$n_1$=refraction index of the material of the measured object
$n_0$=refraction index of the air gap,
$WT_{34}$=layer thickness to be determined,
$C_0$=speed of light in a vacuum.

9. The THz measuring method of claim 1, wherein a layer thickness of a wall region between two boundary surfaces oriented not perpendicular to the optical axis is determined, e.g. that of an inclined inner bar of a profile having at least one further, perpendicular boundary surface or an inclined plate or layer without further boundary surfaces.

10. The THz measuring method of claim 9, wherein when determining the layer thickness of the measured object the following system of equations is used:

GL4:

$$t_{P1} - t_{P0} = (t_2 - t_1) \cdot (n_1 - n_0) + (t_4 - t_3) \cdot (n_1 - n_0) + (t_6 - n_0) \quad \text{GL4a:}$$

$$(t_4 - t_3) = ((t_{P1} - t_{P0})/(n_1 - n_0)) - (t_2 - t_1) - (t_6 - t_5) \quad \text{GL4b:}$$

$$WT_{34} = (t_4 - t_3) \cdot C_0 / 2n_1 = (((t_{P1} - t_{P0})/(n_1 - n_0)) - (t_2 - t_1 - (t_6 - t_5))) \cdot C_0 / 2n_1 \quad \text{GL4c:}$$

where:
$t_{P1} - t_{P0}$=total time delay of the main reflection time (tP1) of the object measurement in relation to the calibration time (tP0) of the calibration measurement
tP1 main reflection time
tP0 calibration time
t2-t1 time difference of the partial reflection times t1 and t2
t4-t3 time difference of the partial reflection times t3 and t4
$n_1$=refraction index of the material of the measured object
$n_0$=refraction index of the air gap,
$WT_{34}$=layer thickness to be determined,
$C_0$=speed of light in a vacuum.

11. The THz measuring method of claim 1, wherein a measured object made of a uniform material, in particular plastics, rubber, paper material, glass, or ceramics, is measured, and for the determination a uniform refraction index of the material is used.

12. The THz measuring method of claim 1, wherein in the case, that all partial reflection times of the measuring peaks in the signal amplitude are determined, a determination of the refraction index of the material of the measured object is carried out by means of a comparison of the object measurement with the calibration measurement.

13. The THz measuring method of claim 12, wherein from the partial reflection times at least one wall time of flight of the THz transmission beam through at least one material region of the measured object is determined, and a time-of-flight delay of the THz transmission beam through the at least one material region or a sum of the time-of-flight delays through several material regions are compared with a time delay of the main reflection time in relation to the calibration time.

14. A THz measuring device for measuring a measured object, the THz measuring device comprising:
a THz transceiver for emitting a THz transmission beams along an optical axis and detecting von THz radiation reflected along the optical axis,
a main reflector, oriented perpendicular to the optical axis, for reflecting the THz transmission beam along the optical axis back to the THz transceiver,
where a measuring space is formed between the THz transceiver and the main reflector for receiving a measured object,
a controller and evaluation means for receiving a signal amplitude of the THz transceivers and evaluating the temporal swipe of said signal amplitude,
said controller and evaluation means carrying out a method according to claim 1.

* * * * *